United States Patent [19]

Horimai et al.

[11] Patent Number: 4,907,211
[45] Date of Patent: Mar. 6, 1990

[54] MAGNETO-OPTICAL RECORDING APPARATUS HAVING AN INVERSION SIGNAL DETECTING MEANS

[75] Inventors: Hideyoshi Horimai; Yoshio Aoki, both of Tokyo, Japan

[73] Assignee: Sony Corporation, Tokyo, Japan

[21] Appl. No.: 184,445

[22] PCT Filed: Jul. 16, 1987

[86] PCT No.: PCT/JP87/00519
§ 371 Date: Mar. 22, 1988
§ 102(e) Date: Mar. 22, 1988

[87] PCT Pub. No.: WO88/01093
PCT Pub. Date: Feb. 11, 1988

[30] Foreign Application Priority Data

Jul. 31, 1986 [JP] Japan .................................. 61-180416

[51] Int. Cl.⁴ ........................ G11B 11/12; G11B 13/04
[52] U.S. Cl. ..................................... 369/13; 360/114; 360/59
[58] Field of Search .................... 369/13, 116; 360/59, 360/114; 365/122

[56] References Cited

U.S. PATENT DOCUMENTS 4,712,203 12/1987 Saito et al. ........................... 369/13

FOREIGN PATENT DOCUMENTS 61-153875 7/1986 Japan .
62-66449 3/1987 Japan .
62-134838 6/1987 Japan .

Primary Examiner—Steven L. Stephan
Assistant Examiner—Hoa T. Nguyen
Attorney, Agent, or Firm—Hill, Van Santen, Steadman & Simpson

[57] ABSTRACT

The present invention relates to a magneto-optical recording apparatus, for example, as shown in FIG. 3, which is capable of rewriting information written in a magneto-optical recording medium by overwriting, wherein the magneto-optical recording medium 1 is irradiated with a laser light LB corresponding to an information signal only when the magneto-optical recording medium 1 is applied with a magnetic field sufficient to invert the magnetizing direction of the magneto-optical recording medium 1, whereby a noise-up region is prevented from being formed and high density recording can be satisfactorily carried out.

1 Claim, 8 Drawing Sheets

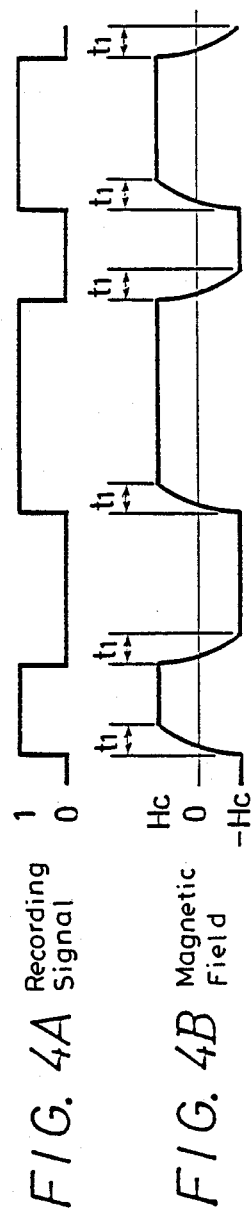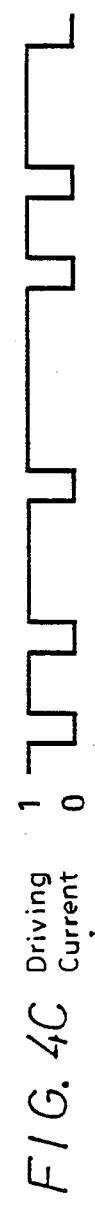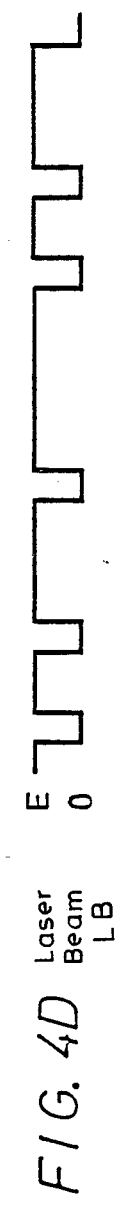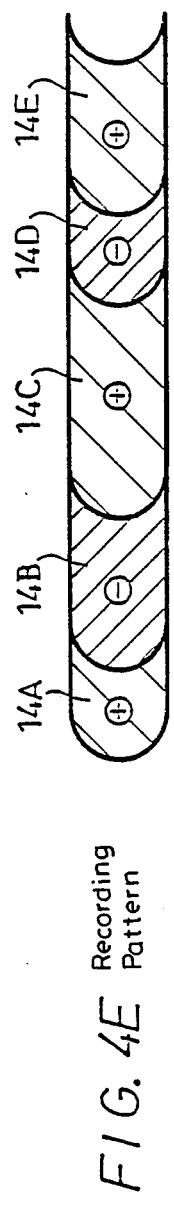
FIG. 4A Recording Signal
FIG. 4B Magnetic Field
FIG. 4C Driving Current $I_1$
FIG. 4D Laser Beam LB
FIG. 4E Recording Pattern
FIG. 4F Reproduced Signal

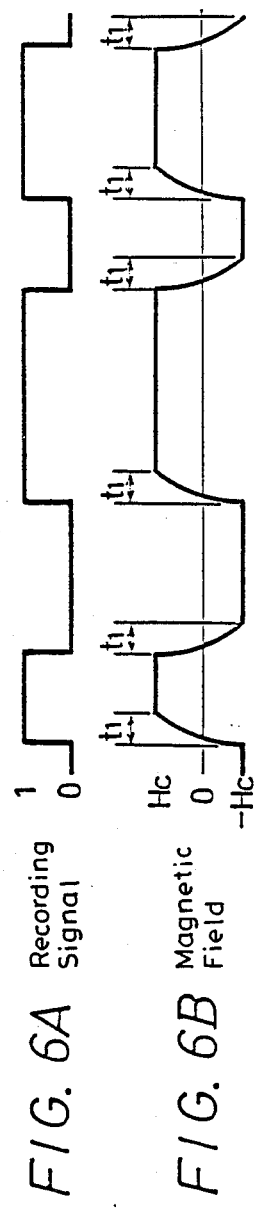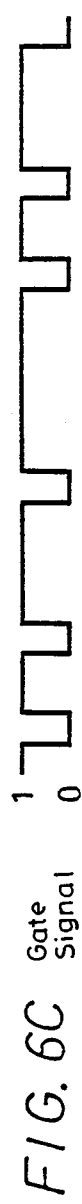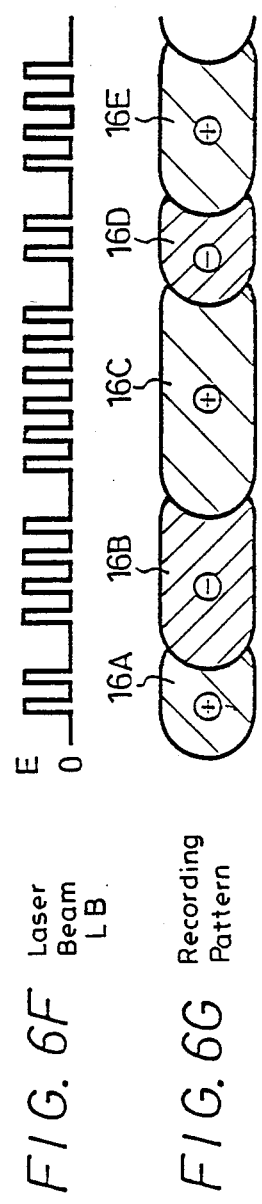

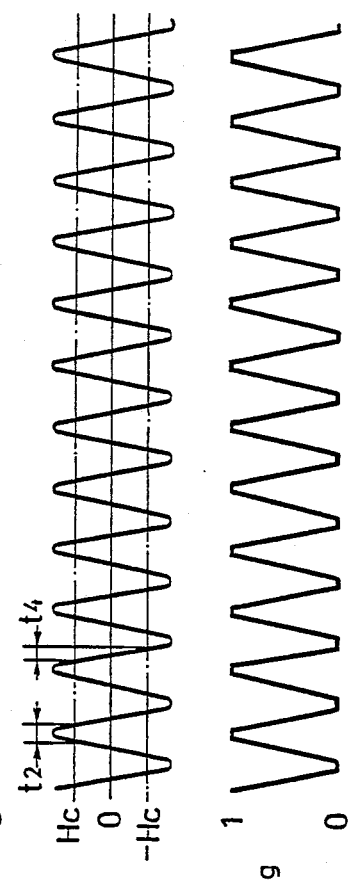
FIG. 8A Recording Signal
FIG. 8B Magnetic Field
FIG. 8C Oscillating Signal
FIG. 8D Output Signal from Coincidence Circuit
FIG. 8E Driving Current $I_3$
FIG. 8F Laser Beam LB
FIG. 8G Recording Pattern
FIG. 8H Reproduced Signal

MAGNETO-OPTICAL RECORDING APPARATUS HAVING AN INVERSION SIGNAL DETECTING MEANS

TECHNICAL FIELD

This invention relates to a magneto-optical recording apparatus which is capable of rewriting information on a magneto-optical recording medium by overwriting.

BACKGROUND ART

Conventionally, there has been proposed an apparatus, the main portion of which is shown in FIG. 1 as a magneto-optical recording apparatus which is capable of rewriting information by overwriting.

In FIG. 1, reference numeral 1 designates a magneto-optical disk, and in the present example, this magneto-optical disk 1 is formed by depositing a perpendicular magnetization layer 3 on a glass substrate 2 and this magneto-optical disk 1 can be rotated with a central axis 0 - 0' as the center.

Further, reference numeral 4 indicates an optical head section for irradiating a laser light LB on the perpendicular magnetization layer 3. In the present example, the optical head section 4 is provided with a semiconductor laser element 5 and a lens 6 and this optical head section 4 is arranged to be movable along the radial direction of the magneto-optical disk 1 maintaining a predetermined distance from the surface of the magneto-optical disk 1. In this case, the optical head section 4 is operative to locally irradiate the perpendicular magnetization layer 3 of the magneto-optical disk 1 with the laser light LB with a constant intensity continuously emitted from the semiconductor laser element 5 through the lens 6 so as to elevate the temperature on the irradiated part of the perpendicular magnetization layer 3 above the Curie point.

Reference numeral 7 designates an electromagnet for applying a magnetic field to he perpendicular magnetized film 3 of the magneto-optical disk 1. In the present example, the electromagnet 7 is placed facing the optical head section 4 with the magneto-optical disk 1 interposed therebetween, and the electromagnet 7 is arranged to be movable along the radial direction of the magneto-optical disk 1, associated with the optical head section 4.

Further in the present example, a magnetic field modulating circuit 8 is provided, the input side of this magnetic field modulating circuit 8 is connected with a recording signal input terminal 9 and the output side of this magnetic field modulating circuit 8 is connected with a coil 7A of the electromagnet 7. By the magnetic field modulating circuit 8, a current, the phase of which is inverted in response to recording signal supplied thereto through the record signal input terminal 9, for example, a current flowing in the direction of an arrow A is supplied to the coil 7A when the signal level of a recording signal is at a high level "1", and a current flowing in the direction of an arrow B is supplied to the coil 7A when the signal level of a record signal is at a low level "0", whereby the electromagnet 7 generates a magnetic field as indicated by an arrow X when the signal level of the recording signal is at the high level "1", and a magnetic field as indicated by an arrow Y when the signal level of the recording signal is at the low level "0". In this case, the magnetic field indicated by the arrow X and the magnetic field indicated by the arrow Y are directed opposite to each other, however, the intensities thereof are made equal to each other. If the intensities of the magnetic field indicated by the arrow X and the magnetic field indicated by the arrow Y are designated Hc and −Hc, respectively, in consideration of their directions, $|\pm Hc|$ are respectively determined to be such an intensity that the magnetizing direction of the perpendicular magnetization layer 3 of the magneto-optical disk 1 can be directed in the direction of the respective magnetic fields.

In the present example of the magneto-optical recording apparatus thus constructed, when a recording signal, for example, as shown in FIG. 2A, is supplied to the magnetic field modulating circuit 8, the electromagnet 7 produces a magnetic field as shown in FIG. 2B, and this magnetic field is to be applied to the perpendicular magnetization layer 3 of the magneto-optical disk 1. In this case, since the perpendicular magnetization layer 3 of the magneto-optical disk 1 has been irradiated with the laser light LB with a constant intensity E which can elevate the temperature of the perpendicular magnetization layer 3 above the Curie point, as shown in FIG., 2C, there are consequently recorded recording patterns 10A, 10B . . . 10E as typically shown in FIG. 2D in a recording track 3A on the perpendicular magnetization layer 3 of the magneto-optical disk 1. Incidentally, the recording of $\oplus$ and $\ominus$ of this case respectively indicate the magne the upward direction (the direction indicated by the arrow X in FIG. 1) and in the downward direction (the direction indicated by the arrow Y in FIG. 1).

As described above, by the magneto-optical recording apparatus of the present example, a minute portion on the perpendicular magnetization layer 3 of the magneto-optical disk 1 is continuously heated above the Curie point with the laser light LB, the heated minute portion is moved, and when the temperature thereof becomes in the proximity of the Curie point, the portion in the proximity of the Curie point is magnetized in the direction of the magnetic field which is modulated in accordance with the recording signal. When the temperature is further lowered, the magnetization is maintained to thereby magneto-optically recording signals, taking a portion of a size smaller than that of the heated minute portion to be a unit. According to such the magneto-optical recording apparatus, regardless of any information recorded on the perpendicular magnetization layer 3 of the magneto-optical disk 1, it is possible to record new information by overwriting.

However, in the conventional magneto-optical recording apparatus as shown in FIG. 1, when the magnetic field which is applied to the perpendicular magnetization layer 3 of the magneto-optical disk 1 is inverted in its direction in accordance with the signal level of the recording signal, a definite time period $t_1$ as shown in FIG. 2B is required. During the inverting time period $t_1$, although the magnetic field with the intensity $|\pm Hc|$, necessary for orientating the magnetization in the direction of the magnetic field, is not applied to the perpendicular magnetization layer 3, since it is continuously irradiated with the laser light LB with the constant intensity E, regions in which the noise level is increased to cause errors to easily occur during reproduction, that is, so-called noise-up regions 11A, 11B . . . 11E, as shown in FIG. 2D, occur in the recording track 3A corresponding to the magnetic field inverting time period $t_1$, thereby incurring a disadvantage that high density recording cannot be satisfactorily carried out.

DISCLOSURE OF THE INVENTION

In view of the above-mentioned inconvenience, it is an object of the present invention to provide a magneto-optical recording apparatus which can avoid the formation of the noise-up region and thereby satisfactorily perform high density recording.

The magneto-optical recording apparatus according to the present invention is, for example, as shown in FIGS. 3 to 8, operative to irradiate the magneto-optical recording medium 1 with the laser light LB in accordance with information signals only when the magneto-optical recording medium 1 is applied with a magnetic field which is sufficient to invert the magnetizing direction of the magneto-optical recording medium 1.

According to the present invention as described above, when the magneto-optical recording medium 1 is not applied with the magnetic field sufficient to invert the magnetizing direction of the magneto-optical recording medium 1, the magneto-optical disk 1 is not irradiated with the laser light LB, so that the noise-up region will not be formed.

BEST MODE FOR CARRYING OUT THE INVENTION

Figure 1:
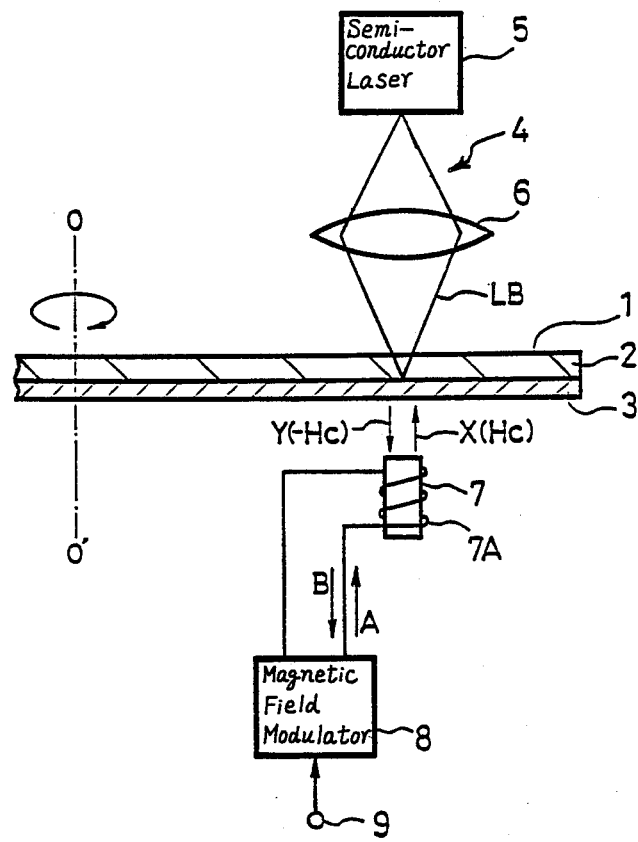
FIG. 1 is a construction diagram showing an example of a conventional magneto-optical recording apparatus, FIGS. 2(A-D) are diagrams used for explaining FIG. 1.
Figure 2:
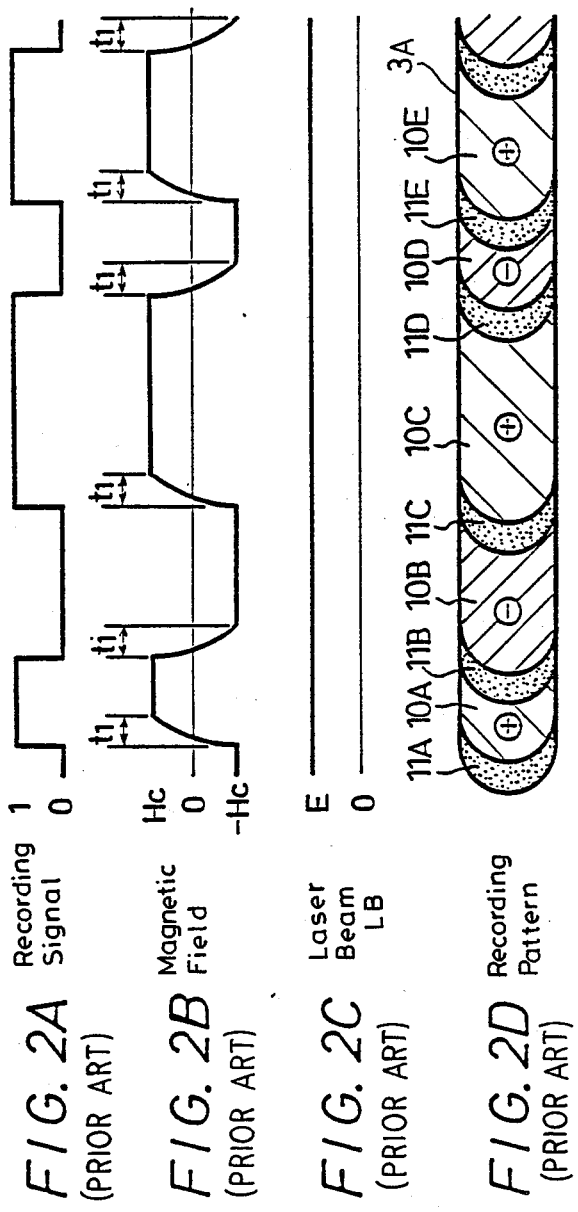
Figure 3:
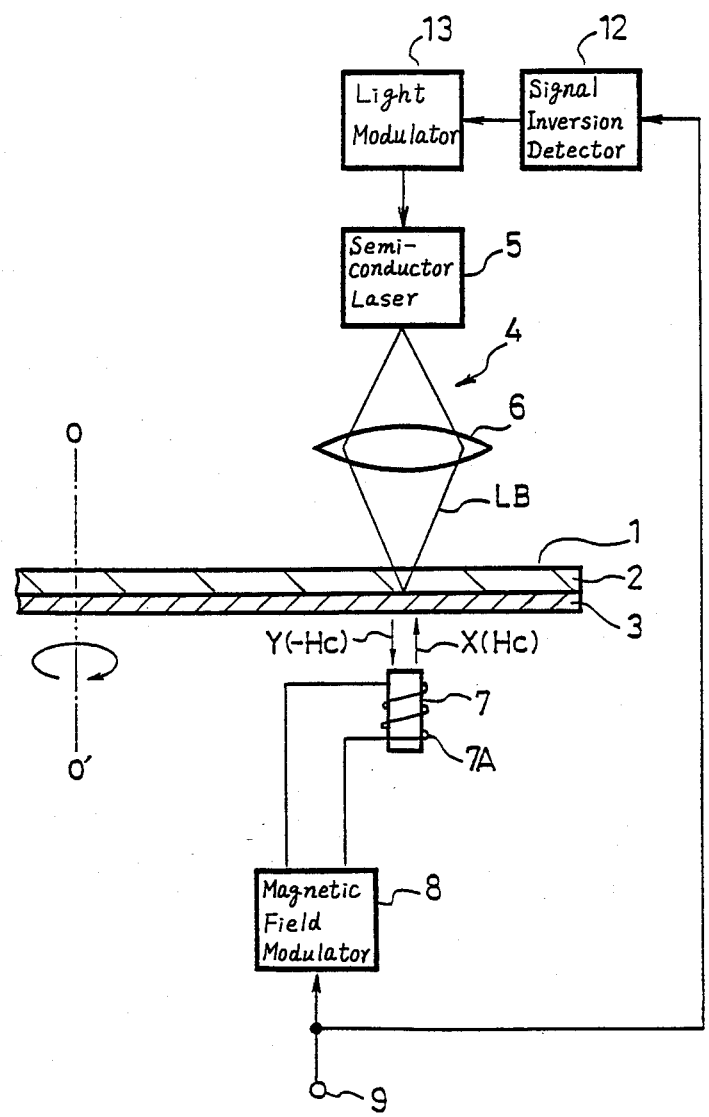
FIG. 3 is a construction diagram showing an embodiment of a magneto-optical recording apparatus according to the present invention, FIGS. 4(A-D) are diagrams used for explaining the embodiment shown in FIG. 3.

An embodiment of a magneto-optical recording apparatus according to the present invention will hereinafter be explained with reference to FIGS. 3 and 4. In FIGS. 3 and 4, the parts corresponding to those in FIGS. 1 and 2 are marked with the same reference numerals and detailed explanation thereof will be omitted.

In the present embodiment, a recording signal inputted through the recording signal input terminal 9 is supplied to an inversion detecting circuit 12, wherein when the recording signal changes its signal level, that is, the recording signal inverts its phase, the signal inversion detecting circuit 12 derives a signal inversion detecting output at its output side, and the signal inversion detecting signal is supplied to a light modulating circuit 13. In the present embodiment, the light modulating circuit 13 is operative to supply the semiconductor laser element 5 in a DC fashion with a driving current $I_1$ necessary for the semiconductor laser element 5 to generate the laser light LB with the constant intensity E. However, when the signal inversion detecting signal is supplied from the signal inversion detecting circuit 12 thereto, for example, a mono-stable multivibrator is driven so as not to supply the semiconductor laser 5 with the driving current $I_1$ for an operating time period of the mono-stable multivibrator, that is, for the magnetic field inverting time period $t_1$. In other words, the light modulating circuit 13 is operative to supply the semiconductor laser element 5 with the driving current $I_1$ only when the perpendicular magnetization layer 3 of the magneto-optical disk 1 is applied with the magnetic field with the intensity $|\pm HC|$ necessary to orientate the magnetizing direction of the perpendicular magnetization layer 3 to the direction of the magnetic field. The remaining part is constructed in the same manner as the conventional example shown in FIG. 1.

In the embodiment of the magneto-optical recording apparatus shown in FIG. 3 thus constructed, when a recording signal as shown in FIG. 4A, similar to that shown in FIG. 2A, is supplied thereto, the electromagnet 7 generates a magnetic field as shown in FIG. 4B, similar to that shown in FIG. 2B, that is, the magnetic field which has the intensity $|\pm Hc|$ necessary to orientate the magnetizing direction of the perpendicular magnetization layer 3 to the direction of the magnetic field and the definite magnetic field inverting time period $t_1$. Meanwhile, the light modulating circuit 13 supplies the semiconductor laser element 5 with the driving current $I_1$, as shown in FIG. 4C, only for a period in which the perpendicular magnetization layer 3 is applied with the magnetic field which has the intensity $|\pm Hc|$ necessary to orientate the magnetizing direction of the perpendicular magnetization layer 3 to the direction of the magnetic field. Then, the semiconductor laser element 5 generates the laser light LB having the intensity E corresponding to the driving current $I_1$, as shown in FIG. 4D. As described above, in the embodiment of FIG. 3, since the perpendicular magnetization layer 3 is irradiated with the laser light LB only when the perpendicular magnetization layer 3 of the magneto-optical disk 1 is applied with the magnetic field which has the intensity $|\pm Hc|$ necessary to orientate the magnetizing direction of the perpendicular magnetization layer 3 to the direction of the magnetic field and the laser light LB is not emitted for the time period $t_1$ in which the magnetic field is inverted, the noise-up region will never be formed in the recording track 3A of the perpendicular magnetization layer 3 and recording patterns 14A, 14B ... 14E, as shown in FIG. 4E, are formed corresponding to the recording signal shown in FIG. 4A, whereby a reproduced signal without errors, as shown in FIG. 4F, can be obtained upon reproduction.

Thus, in the embodiment of FIG. 3, the noise-up region is not formed, so that high density recording can be satisfactorily carried out.

Next, another embodiment of the present invention will be explained with reference to FIGS. 5 and 6. The embodiment of FIG. 5 is intended to pulsatively emit the laser light LB to thereby prolong the life span of the semiconductor laser element 5.

Figure 5:
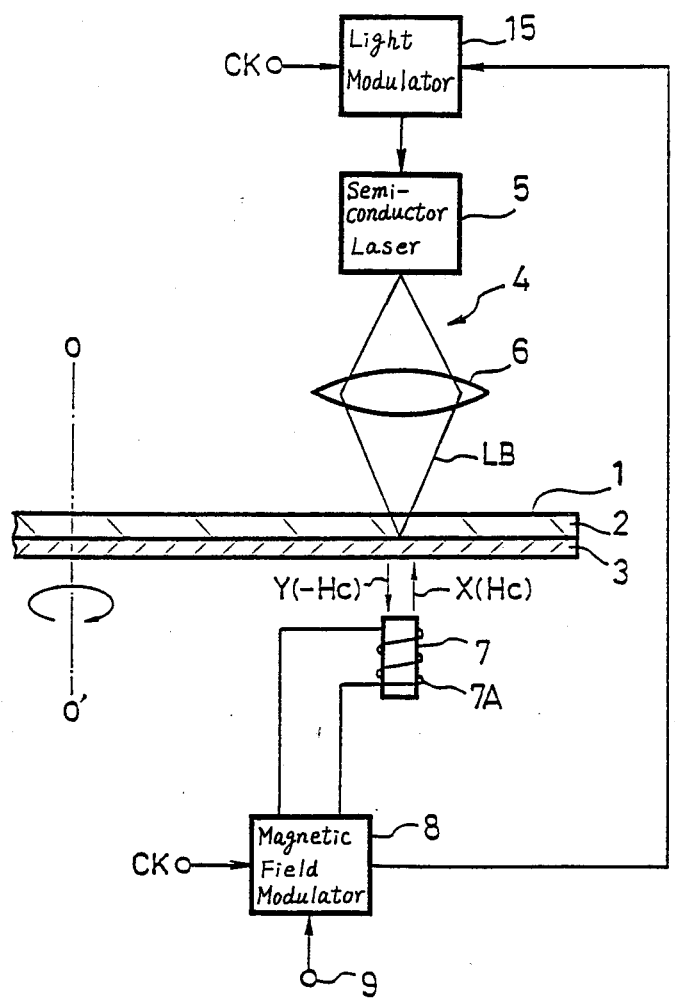
FIG. 5 is a construction diagram showing another embodiment of the present invention, FIGS. 6(6A-H) are diagrams used for explaining the embodiment shown in FIG. 5.

In the embodiment of FIG. 5, the recording signal supplied to the magnetic field modulating circuit 8 is synchronized with a clock signal CK, and the electromagnet 7 generates a magnetic field on the basis of the synchronized recording signal. The magnetic field modulating circuit 8 is operative, corresponding to the magnetic field generated in the electromagnet 7, to form a signal which is at the high level "1" while the perpendicular magnetization layer 3 is applied with the magnetic field which has the intensity $|\pm Hc|$ necessary to orientate the magnetizing direction of the perpendicular magnetization layer 3 to the direction of the magnetic field, and at the low level "0" for the magnetic field inverting time period $t_1$. This signal is supplied to a light modulating circuit 15 as a gate signal. In this case, it is possible that the output from the magnetic field modulating circuit 8 is supplied to a signal inversion detecting circuit as shown in FIG. 3, the output from the signal inversion detecting circuit is supplied to the mono-stable multivibrator, and the output from the mono-stable multivibrator is used to form the gate signal. Meanwhile, the clock signal CK is supplied to the light modulating circuit 15 in a manner that the light modulating circuit 15 can supply the semiconductor laser element 5 with a driving current $I_2$ which is controlled by the clock signal CK. The remaining part is constructed in the same manner as the conventional example shown in FIG. 1.

In the embodiment of the magneto-optical recording apparatus shown in FIG. 5 thus constructed, a magnetic field as shown in FIG. 6B is generated from the electromagnet 7 in accordance with a recording signal synchronized with the clock signal CK as shown in FIG. 6A. Since the light modulating circuit 15 is supplied with the gate signal as shown in FIG. 6C and the clock signal CK as shown in FIG. 6D, the semiconductor laser element 5 is supplied with the driving current $I_2$ as shown in FIG. 6E so that the semiconductor laser element 5 generates the laser light LB as shown in FIG. 6F corresponding to the driving current $I_2$. Therefore, in the embodiment of FIG. 5, recording pattern 16A, 16B .... 16E as shown in FIG. 6E are formed on the recording track 3A of the perpendicular magnetization layer 3. In this case, since the laser light LB is not emitted to the perpendicular magnetization layer 3 for the magnetic field inverting time period $t_1$ in the same manner as the embodiment of FIG. 3, the noise-up region will never be formed in the same manner as the embodiment of FIG. 3, so that upon reproduction the error-free reproduced signal, as shown in FIG. 6H, can be obtained corresponding to the recording signal.

In the embodiment of FIG. 5 as described above, since the noise-up region is not formed in the same manner as the embodiment of FIG. 3, high density recording can be satisfactorily carried out. Particularly, in the embodiment of FIG. 5, since the laser light LB is pulsatively generated, the life span of the semiconductor laser element 5 can be prolonged.

Next, a further embodiment of the present invention will be explained with reference to FIGS. 7 and 8.

In the present embodiment, an resonance circuit 18 is formed of a serial connection of the coil 7A of the electromagnet 7 and a capacitor 17 so as to provide an oscillating circuit 19 which employs the coil 7A of the electromagnet 7 as an oscillating coil. In this case, a capacitance value C of the capacitor 17 is selected in a manner that a resonance frequency $f_0$ of the resonance circuit 18 is determined to be a frequency 2fm twice the maximal frequency fm of the recording signal. Thus, the electromagnet 7 generates a magnetic field as shown in FIG. 8B which is inverted in its direction at the frequency 2fm, and this magnetic field is applied to the perpendicular magnetization layer 3 of the magneto-optical disk 1. In this case, the peak value of the magnetic field is made larger than the intensity $|\pm Hc|$ which is necessary to orientate the magnetizing direction of the perpendicular magnetization layer 3 to the direction of the magnetic field.

Further in the present embodiment, the oscillating signal generated in the oscillating circuit 19 is supplied through a waveform shaping circuit 20 to a coincidence circuit 21 at one of its input terminals. In this case, the waveform shaping circuit 20 is so arranged as to make the peak portions of the oscillating signal flat, as shown in FIG. 8C, as well as carry out a necessary level adjustment.

Further in the present embodiment, the recording signal inputted to the recording signal input terminal 9 is supplied to the coincidence circuit 21 at the other input terminal, such that the coincidence circuit 21 derives the high level signal at its output side when the recording signal and the oscillating signal are both at the high level or both at the low level, and the high level signal is supplied to a light modulating circuit 22. In this case, the light modulating circuit 22 supplies the semiconductor laser element 5 with a pulsative driving current $I_3$ corresponding to the high level signal only when the high level signal is supplied from the coincidence circuit 21 thereto, whereby the semiconductor laser element 5 emits the laser light LB corresponding to the driving current $I_3$. Here, it is necessary to determine the pulse width of the driving current $I_3$, that is, the pulse width of the laser light LB to be a time period $t_3$ which is shorter than the time period $t_2$ for which the intensity of the magnetic field becomes larger than $|\pm Hc|$.

Further in the present embodiment, the light modulating circuit 22 and the oscillating circuit 19 are both supplied with the clock signal CK so as to synchronize the laser light LB with the magnetic field.

Figure 7:
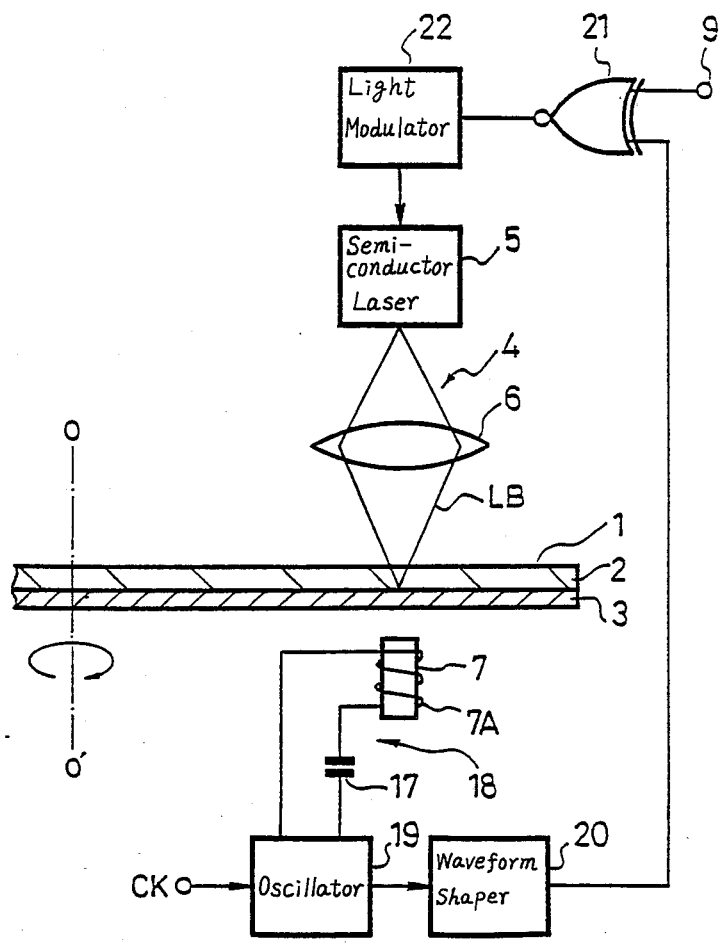
FIG. 7 is a construction diagram showing further embodiment of the present invention, and FIGS. 8(A-H) are diagrams used for explaining the embodiment shown in FIG. 7.

In the embodiment of the magneto-optical recording apparatus of FIG. 7 thus constructed, the coincidence circuit 21 is supplied with the oscillating signal as shown in FIG. 8C at one of its input terminals, so that when the coincidence circuit 21 is supplied, for example, with the recording signal as shown in FIG. 8A at the other input terminal, the coincidence circuit 21 can derive at its output side the high level signal "1" as shown in FIG. 8D only when the record signal and the oscillating signal are both at the high level or both at the low level. Therefore, the light modulating circuit 22 supplies the semiconductor laser element 5 with the driving current $I_3$ as shown in FIG. 8E corresponding to the output signal from the coincidence circuit 21, and accordingly the semiconductor laser element 5 emits the laser light LB as shown in FIG. 8F corresponding to the driving current $I_3$. Meanwhile, in this case, the electromagnet 7 generates the magnetic field as shown in FIG. 8B which is synchronized with the pulsative laser light LB, and this magnetic field is applied to the perpendicular magnetization layer 3 of the magneto-optical disk 1, so that, in the present embodiment, recording patterns 23A, 23B ... 23ED as shown in FIG. 8G are formed on the perpendicular magnetization layer 3. In this case, for a time period $t_4$ in which the intensity of the magnetic field generated from the electromagnet 7 is below the intensity $|\pm Hc|$ sufficient to orientate the magnetizing direction of the perpendicular magnetization layer 3 to the direction of the magnetic field, the semiconductor laser element 5 is not supplied with the driving current $I_3$, and accordingly the perpendicular magnetization layer 3 is not irradiated with the laster light LB iuun this period, so that a recording pattern is formed as shown in FIG. 8G without forming the noise-up region, in the same manner as the embodiments of FIGS. 3 and 5, whereby, upon reproduction, an error-free reproduced signal can be obtained as shown in FIG. 8H.

Thus, also in the embodiment of FIG. 7, the perpendicular magnetization layer 3 is prevented the noise-up region from being formed on the recording track thereof, so that high density recording can be satisfactorily carried out.

Also, since the laser light LB is pulsatively emitted, the life span of the semiconductor laser element 5 can be prolonged.

Further, since the pulse width of the laser light LB is made short, it is possible to heat up only the perpendicular magnetization layer 3, with the result that the heating efficiency is increased and the reliability of the protective layer is also improved.

Further, since the heat distribution on the perpendicular magnetization layer is constant at every pulse of the laser light LB, the interference between codes upon recording by the heat diffusion can be readily obtained, whereby principal causes for the generation of peak, shift and jitter can be removed.

Further since the magnetic field to be applied to the perpendicular magnetization layer 3 is generated by the oscillating circuit 19 employing the resonance circuit 18 formed of the electromagnet 7 and the capacitor 17, it is possible to easily design an electric power source circuit for the electromagnet 7 and the oscillating circuit 19 as well as make the electric power source circuit smaller, and thereby reduce the production cost thereof.

It is no saying that the present invention is not limited to the above described embodiments and a variety of other constructions can be made without departing from the scope of the present invention.

What is claimed is:

1. A magneto-optical recording apparatus for recording and reproducing information on a magneto-optical recording medium having a perpendicular magnetization direction, comprising:

Laser means for emitting a light beam onto the recording medium;

Magnetic field biasing means, responsive to a magnetic field modulating means, for generating a magnetic field modulated in accordance with binary information signals;

A light modulating means, receiving an inversion signal corresponding to an inversion of the magnetic biasing field, for providing a current to drive said laser, only during, the magnetic recording medium is applied with a magnetic field sufficient to invert the magnetization direction of the recording medium but not during the inversion of the magnetic biasing field;

A signal inversion detecting means, receiving the binary information signals, for detecting the inversion of the magnetic biasing field and for inputting the inversion signal into the light modulating means.

* * * * *